United States Patent
Lee et al.

(10) Patent No.: US 11,056,113 B2
(45) Date of Patent: Jul. 6, 2021

(54) CONVERSATION GUIDANCE METHOD OF SPEECH RECOGNITION SYSTEM

(71) Applicants: Hyundai Motor Company, Seoul (KR); Kia Motors Corporation, Seoul (KR)

(72) Inventors: Kyung Chul Lee, Seongnam-si (KR); Jae Min Joh, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 63 days.

(21) Appl. No.: 16/413,884

(22) Filed: May 16, 2019

(65) Prior Publication Data

US 2020/0193984 A1  Jun. 18, 2020

(30) Foreign Application Priority Data

Dec. 12, 2018  (KR) .................. 10-2018-0159722

(51) Int. Cl.
| | |
|---|---|
| *G10L 15/22* | (2006.01) |
| *B60K 35/00* | (2006.01) |
| *G06F 3/16* | (2006.01) |

(52) U.S. Cl.
CPC ............ *G10L 15/22* (2013.01); *B60K 35/00* (2013.01); *G06F 3/167* (2013.01); *B60K 2370/148* (2019.05); *B60K 2370/161* (2019.05); *G10L 2015/223* (2013.01); *G10L 2015/225* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 2008/0177541 A1* | 7/2008 | Satomura ...................... 704/251 |
| 2009/0150156 A1* | 6/2009 | Kennewick ............ G10L 15/00 704/257 |
| 2017/0213551 A1* | 7/2017 | Ji .......................... B60W 50/10 |
| 2018/0096681 A1* | 4/2018 | Ni ........................ G10L 15/1822 |
| 2019/0303438 A1* | 10/2019 | Wilson .................... G10L 15/30 |
| 2019/0362217 A1* | 11/2019 | Gandiga .................. G06F 40/30 |
| 2020/0184956 A1* | 6/2020 | Agarwal ................. G10L 15/07 |

FOREIGN PATENT DOCUMENTS

KR  10-1675144 B1  4/2016

* cited by examiner

*Primary Examiner* — Stella L. Woo
(74) *Attorney, Agent, or Firm* — Morgan, Lewis & Bockius LLP (57) ABSTRACT

A conversation guidance method of a speech recognition system may include managing a user domain based on speech recognition function information and situation information corrected from a system mounted on a vehicle, generating a conversation used for speech recognition based on the user domain, and guiding a user with the generated conversation.

10 Claims, 7 Drawing Sheets

CONVERSATION GUIDANCE METHOD OF SPEECH RECOGNITION SYSTEM

CROSS-REFERENCE TO RELATED APPLICATION

The present application claims priority to Korean Patent Application No. 10-2018-0159722, filed on Dec. 12, 2018, the entire contents of which is incorporated herein for all purposes by this reference.

BACKGROUND OF THE INVENTION

Field of the Invention

The present invention relates to a technique for guiding a user with a conversation used for speech recognition.

Description of Related Art

Speech recognition technology is a technique for extracting a feature from a speech signal, applying a pattern recognition algorithm to the extracted feature, and then back-tracking the speech signal to know which phoneme or word string is generated by a speaker's utterance.

Recently, various schemes for improving the accuracy of speech recognition have been provided. A speech recognition scheme using speech act information estimates a speech act based on the recognition result obtained in a primary speech recognition process and then searches the final recognition result by use of a language model specified to the estimated speech act. However, according to the scheme, when the speech act estimation error occurs due to the error accompanying the recognition result obtained in the primary speech recognition process, there is a high possibility that an incorrect final recognition result is derived.

As another scheme, for example, a domain-based speech recognition technology has been widely used, in which a plurality of domains are classified according to topics such as weather, sightseeing, and the like, an acoustic model and a language model specified to each domain are generated, and then a provided speech signal is recognized by use of the acoustic and language models. According to the present scheme, when a speech signal is input, speech recognition is performed in parallel on a plurality of domains to generate recognition results, and then the recognition result with the highest reliability among the plurality of recognition results is finally selected.

Because the domain-based speech recognition technology needs to perform semantic analysis for all domains, the processing speed is slowed down as the number of domains increases, and it is highly likely that the voice command of a user will be interpreted as an ambiguous meaning, so that it may be impossible to obtain a high-accuracy result. Accordingly, the user is presented with a guidance message such as "It is not recognized, please input again" or the result obtained through web search as an exceptional process. In the instant case, the exceptional process provides a low accuracy result, and the reliability of speech recognition performance deteriorates as the number of exception processes increases.

Furthermore, as the number of domains increases, the number of services to be supported increases. As a result, the number of voice commands used for each service increases, so that it is difficult for a user to grasp such voice commands.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a conversation guidance method of a speech recognition system, which is configured for allowing a user to easily recognize a voice command used for speech recognition by allowing the speech recognition system to guide the user with a customized conversation and improving user satisfaction through a proposal corresponding to a situation of the user, wherein the speech recognition system generates a domain (hereinafter, referred to as a user domain) optimized for the user based on a function and a situation of a vehicle and manages the user domain by reflecting a user's selection of an exceptionally processed result which is not normally recognized.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a method of guiding a conversation for a speech recognition system may include managing a user domain based on speech recognition function information and situation information collected from a system mounted on a vehicle, generating a conversation used for speech recognition based on the user domain, and guiding a user with the generated conversation. The conversation may include a voice command.

The generating of the conversation may include, when a function corresponding to a voice command exceptionally processed is added, weighting the voice command to increase frequency of guidance.

The guiding of the user may include guiding the generated conversation by a voice or sentence.

The user domain may include a plurality of main domains, and each of the plurality of main domains may include a plurality of subdomains.

The managing of the user domain may include activating or inactivating a specific main domain, and activating or inactivating a specific subdomain.

The managing of the user domain may include determining whether to activate the main domain and the subdomain based on user preference information collected from the system mounted on the vehicle.

The determining of whether to activate the main domain and the subdomain may include determining whether to activate the main domain and the subdomain based on a menu priority or a favorite set by the user as the user preference information.

The managing of the user domain may include further managing the user domain by reflecting a user selection of an exceptionally processed result.

The further managing of the user domain may include assigning a weight to a domain selected by the user.

The further managing of the user domain may include generating an exception processing model '1' based on a user selection of an exceptionally processed result of an ambiguous command, and generating an exception processing model '2' based on a user selection of an exceptionally processed result of an unsupported command.

According to various aspects of the present invention, a method of guiding a conversation for a speech recognition system may include collecting failure information related to a vehicle from a system mounted on the vehicle, generating a conversation based on the failure information related to the vehicle, and guiding a user with the generated conversation. In the instant case, the conversation is a scenario of a type of a proposal.

According to various aspects of the present invention, a method of guiding a conversation for a speech recognition system may include managing a schedule of a user in cooperation with a system mounted on a vehicle, generating a conversation based on the schedule, and guiding a user with the generated conversation. In the instant case, the conversation is a scenario of a type of a proposal.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
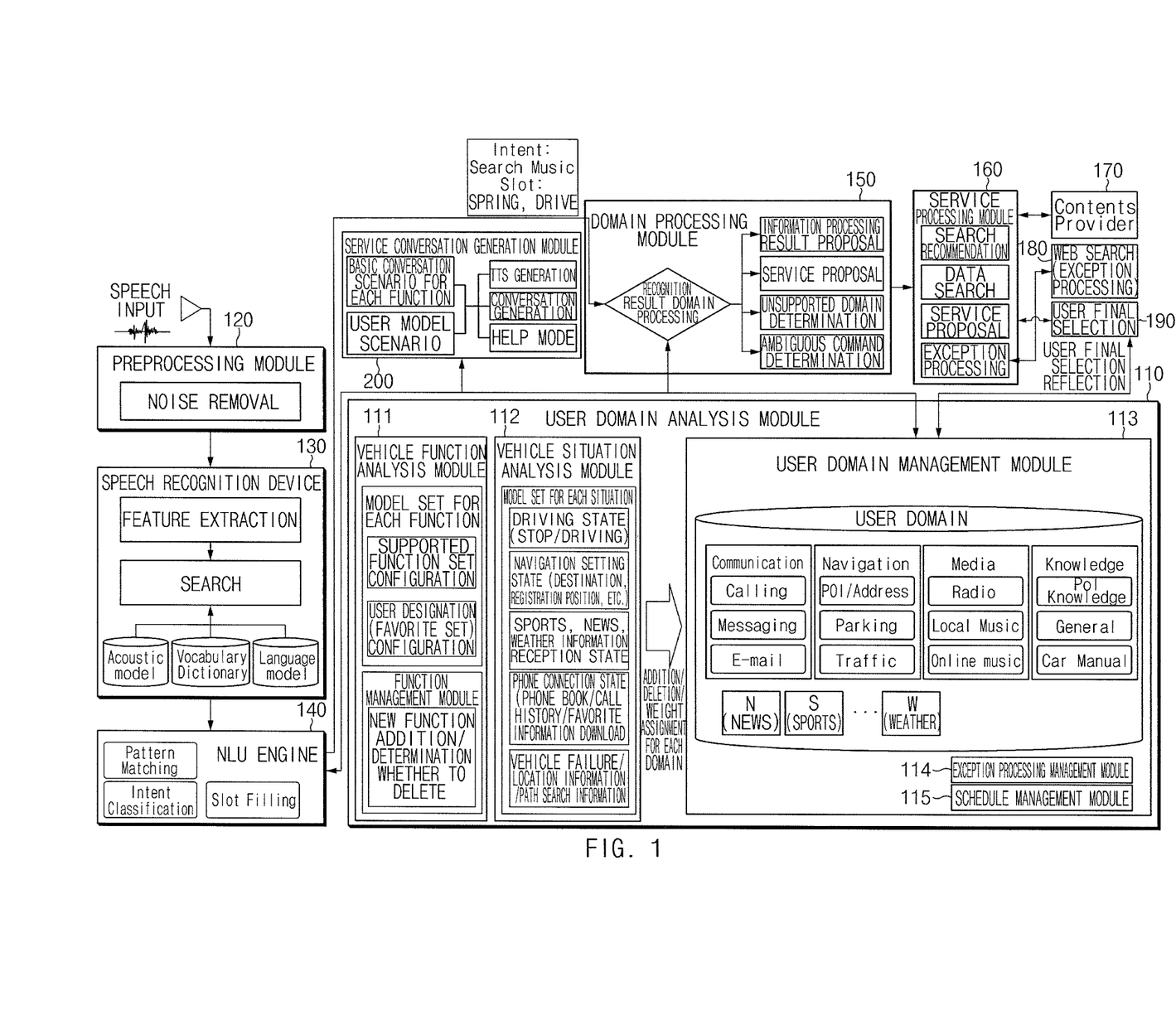
FIG. 1 is a conceptual view exemplarily illustrating a conversation guidance process of a speech recognition system according to an exemplary embodiment of the present invention.

FIG. 1 is a conceptual view exemplarily illustrating a conversation guide process of a speech recognition system according to an exemplary embodiment of the disclosure, and shows functional blocks of a processor of a speech recognition system applied to a vehicle.

First, a user domain analysis module 110, which is a functional block for generating a domain (hereinafter referred to as a user domain) optimized for a user based on a function and a situation of a vehicle (an operating state of a system provided in the vehicle) and managing the user domain by reflecting the user selection of an exceptionally processed result which is not normally recognized, may include a vehicle function analysis module 111, a vehicle situation analysis module 112, a user domain management module 113, and an exception processing management module 114.

The vehicle function analysis module 111, which is a functional block for constructing a model set for each function, forms a function set related to speech recognition provided by the vehicle. That is, speech recognition-related function information is collected from various systems installed in the vehicle. For example, a domain set for functions related to speech recognition provided by an audio video navigation (AVN) system of the vehicle may be configured.

The vehicle function analysis module 111 may form a main domain and a subdomain based on functions supported by an in-vehicle system. In the instant case, the support function set may be constituted as follows.

1) Calling function—supported
2) Messaging function—supported when Android phone is connected, unsupported when I-phone is connected
3) E-mail function—unsupported 4) Car manual providing—supported
5) Online music providing—supported when a user subscribes to an online music site and permits to link The vehicle function analysis module 111 may form a domain by reflecting user preference such as menu priority, a favorite, and the like set by the user. For example, it is possible to increase the weight of a domain that corresponds to a high-priority menu or corresponds to a function included in the favorite. For reference, the higher the weight of the domain is, the higher the probability of being derived as a speech recognition result.

The vehicle function analysis module 111 may include a function management module for managing addition and deletion of a speech recognition function provided by the system mounted on the vehicle. Therefore, the vehicle function analysis module 111 may analyze the speech recognition function provided by the vehicle mounted on the vehicle in real time.

The vehicle function analysis module 111 may notify the user domain management module 113 of the addition and deletion of the speech recognition function provided by the system mounted on the vehicle.

The vehicle situation analysis module 112, which is a functional block for constructing a model set for each situation, may collect vehicle situation information from various systems mounted on the vehicle. For example, situation information, such as a driving state (stop, parking), a navigation setting state (destination, registration location, favorite, and the like), an information (sports, news, weather, and the like) receiving state, a phone connection state (phone book, call history, favorite, data download), and the like, may be collected.

The vehicle situation analysis module 112 may analyze the frequency of use of each main domain and each sub-domain corresponding to the driving state, and assign a weight to each main domain and each sub-domain.

For example, when the frequency of use of a domain frequently used by a user during driving is 50% for communication, 30% for media, 10% for news, and 10% for navigation, a weight may be assigned corresponding to the frequency of use. In the instant case, a domain having a weight value of '0 (zero)' is disabled while driving.

As an exemplary embodiment of the present invention, when the frequency of use of a domain frequently used by the user when the vehicle is stopped is 50% for navigation search, 30% for knowledge search, and 20% for news, a weight may be assigned corresponding to the frequency of use. In the instant case, a domain having a weight value of 0 is disabled while driving.

As yet another example, the communication domain is disabled when the phone is not connected, and the corresponding communication domain and the subdomain may be weighted corresponding to the frequency of using the phone while driving.

The vehicle situation analysis module 112 may determine whether to activate the main domain and the subdomain by analyzing the above-described situations in a combining manner, and assign a weight to the main domain and the subdomain.

The vehicle situation analysis module 112 may collect failure information related to the vehicle, location information related to the vehicle, current time information, route search information (destination information), and the like through a vehicle network and the system mounted on the vehicle.

When a smartphone is connected, the vehicle situation analysis module 112 may collect anniversary information, telephone numbers, names stored in the smartphone.

The user domain management module 113, which is a functional block for managing a user domain, periodically manages a user domain model.

As shown in FIG. 1, the user domain model may include a communication domain, a navigation domain, a media domain, a knowledge domain, a news domain, a sports domain, a weather domain, and the like. In the instant case, the communication domain may include calling, messaging, and e-mail as a subdomain, and the navigation domain may include position-of-interest (POI)/address, parking, and traffic as a subdomain. The media domain may include radio, local music, online music as a subdomain, and the knowledge domain may include POI knowledge, general, and vehicle manual as a subdomain. In the instant case, the news domains, the sports domain, and the weather domain are in a disable state as the main domains, and the e-mail, radio, and general are also in a disable state as the subdomains.

Figure 2:
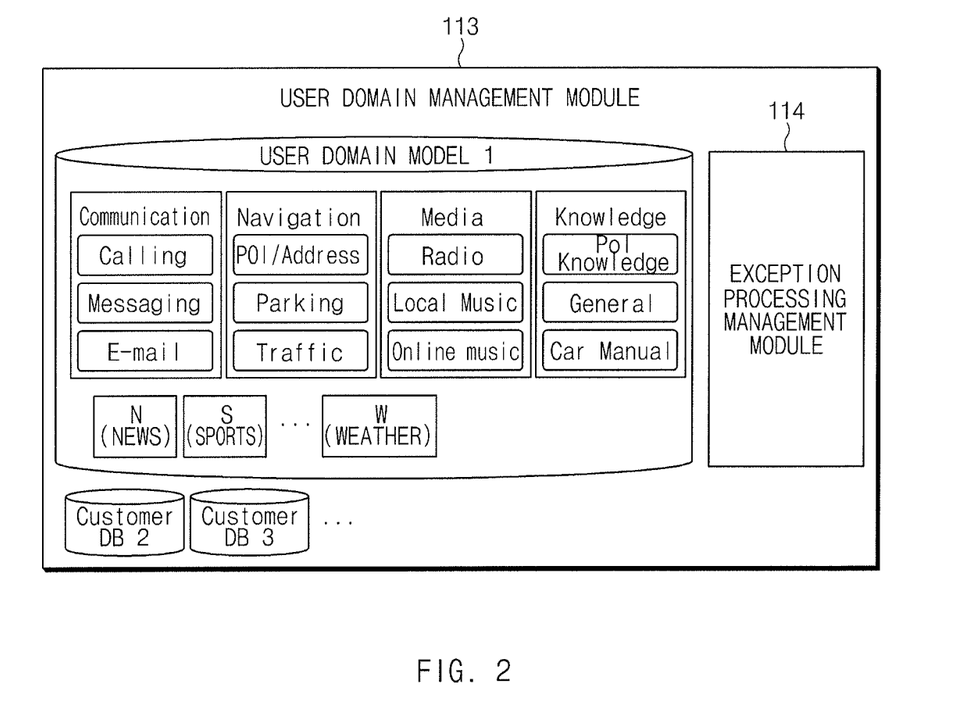
FIG. 2 is a view exemplarily illustrating a user domain model generated for a plurality of users according to an exemplary embodiment of the present invention.

When constructed in the server, the user domain management module 113 may generate and manage a user domain model optimized for a corresponding user for a plurality of users. That is, as shown in FIG. 2, the user domain management module 113 may generate and manage a customer DB '2' for storing a second user domain model, a customer DB '3' for storing a third user domain model, and the like.

The exception processing management module 114, which is a functional block for managing the user domain by reflecting a user selection of an exceptionally processed result which is not normally recognized, may collect data on an unsupported domain and an exceptionally processed case which may be classified into an ambiguous command.

The exception processing management module 114 may collect corpuses for unsupported commands or supportable but ambiguous utterances among domains that are supportable based on the collected data, and distinguish the unsupported and ambiguous commands by use of the corpuses, so that it is possible to provide guidance to the user when a command separated as the unsupported command is uttered.

When a user selection exists among the results of exceptionally processed ambiguous utterance, the exception processing management module 114 may assign an additional weight to the corresponding domain such that the semantic analysis is performed in the corresponding domain.

For example, a main keyword for grasping intension of a natural language for each domain, such as 'Please find Starbucks', 'Starbucks guide', 'Starbucks where', and the like, is required to recognize the corresponding domain. There is no vocabulary in a sample utterance of a user such as 'Starbucks?' to know what the user utterance means. In the instant case, exception processing may be performed, and when the user selects map search from the exceptional result or searches for 'Starbucks' through navigation, the exception processing management module 114 may assign a weight to the navigation domain. Thus, the navigation guide may be performed immediately after "Starbucks?" is input.

When there is a user selection in the result of exception processing due to the utterance of an unsupported command, the exception processing management module 114 may assign an additional weight to the corresponding domain so that the semantic analysis is performed in the corresponding domain.

For example, although a user clearly utters 'spring sky', when it is impossible to grasp the intention, spring weather information related to a weather domain and fine dust information related to a search domain may be provided.

When the user selects the weather domain, a weight may be assigned to the weather domain, and then, the spring weather information may be provided when 'spring sky' is input. By expanding it, even when similar utterance such as 'autumn sky', 'summer rain', or the like occurs, it is possible to provide fall weather or summer weather through the weather domain.

After all, when the service result in a response to a speech command of the user does not meet the intention of the user, the exception processing management module 114 may manage a user domain based on the selection of the user.

A schedule management module 115 may manage the schedule of the user based on the failure information related to the vehicle, the location information related to the vehicle, the current time information, the route search information (destination information), the anniversary information, the telephone numbers, the names, and the like collected by the vehicle situation analysis module 112.

Next, a preprocessing module 120 removes the noise of the voice input from the user.

Next, a speech recognition device 130 recognizes the speech uttered by the user from the input speech signal, and outputs the recognition result. The recognition result output from the speech recognition device 130 may be text-type utterance.

The speech recognition device 130 may include an automatic speech recognition (ASR) engine. The ASR engine may recognize speech uttered by the user by applying a speech recognition algorithm to the input speech, and may generate a recognition result.

In the instant case, the input speech may be converted into a more useful form for speech recognition, and thus, a start point and an end point may be detected in the speech signal to detect an actual speech section of the input speech. This is called end point detection (EPD). Furthermore, a feature vector extraction technique such as cepstrum, linear predictive coding (LPC), Mel frequency cepstral coefficient (MFCC), filter bank energy, or the like may be applied within the detected section, extracting a feature vector of the input speech. Furthermore, the recognition result may be obtained by comparing the extracted feature vector with a trained reference pattern. To the present end, an acoustic model for modeling and comparing the signal features of speech and a language model for modeling the linguistic order relation of words or syllables corresponding to a recognition vocabulary may be used.

The speech recognition device 130 may use any schemes for recognizing speech. For example, an acoustic model to which a hidden Markov model is applied may be used, or an N-best search scheme combining an acoustic model and a voice model may be used. After selecting up to N recognition result candidates using an acoustic model and a language model, N-best search scheme may improve the recognition performance by re-evaluating the ranking of the candidates.

The speech recognition device 130 may determine a confidence value to secure the reliability of the recognition result. The confidence value is a measure of how reliable the speech recognition result is. For example, a phoneme or word which is a recognition result may be defined as a relative value of the probability that the word has been uttered from another phoneme or word. Therefore, the confidence value may be expressed as a value between '0' and '1', or as a value between '0' and '100'.

When the confidence value exceeds a preset threshold value, the recognition result may be output to perform an operation corresponding to the recognition result. When the confidence value is equal to or less than the threshold value, the recognition result may be rejected.

The text-type utterance, which is the recognition result of the speech recognition device 130, is input to a natural language understanding (NLU) engine 140.

The NLU engine 140 may grasp the utterance intention of the user included in the utterance language by applying a natural language understanding technology. That is, the NLU engine 140 may analyze the meaning of the utterance language.

The NLU engine 140 performs morpheme analysis on the text-type utterance. A morpheme, which is the smallest unit of meaning, represents the smallest semantic element that can no longer be subdivided. Thus, the morpheme analysis, which is a first step in understanding natural language, converts an input string into a morpheme string.

The NLU engine 140 extracts a domain from utterance based on a morpheme analysis result. The domain, which is a domain that can identify a subject of a user utterance language, represents various topics such as route guidance, weather search, traffic search, schedule management, refueling guidance, air control, and the like.

The NLU engine 140 may recognize an entity name from the utterance. The entity name is a proper name such as a name, a place name, an organization name, a time, a date, a money, or the like and an entity name recognition is a work for identifying an entity name in a sentence and determining a kind of the entity name. The meaning of a sentence may be grasped by extracting an important keyword from the sentence through the entity name recognition.

The NLU engine 140 may analyze an action of utterance. The utterance action analysis, which is a work of analyzing the intention of user utterance, grasps the intention of the sentence about whether a user asks a question, requests something, or simply expresses emotion.

The NLU engine 140 extracts an action corresponding to the utterance intention of the user. The utterance intention of the user is grasped based on information such as a domain, an entity name, an utterance action, and the like corresponding to the utterance, and an action corresponding to the utterance intention is extracted.

The processing result of the NLU engine 140 may include, for example, a domain and a keyword corresponding to the utterance, and may further include a morpheme analysis result, an entity name, action information, utterance action information, and the like.

Figure 3:
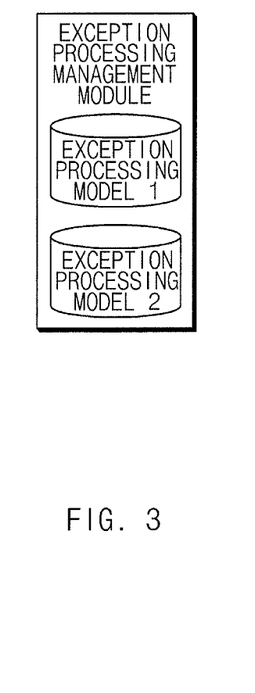
FIG. 3 is a view exemplarily illustrating a configuration of an exception processing management module according to an exemplary embodiment of the present invention.

Next, a domain processing module 150 selects a user domain model and an exception processing model to be referred to by the NLU engine 140. In the instant case, as shown in FIG. 3, the exception processing model, which is a model managed by the exception processing management module 114, means exception processing model '1' generated based on the user selection of an exception processing result of an ambiguous command and exception processing model '2' generated based on the user selection of the exception processing result of an unsupported command.

The domain processing module 150 may propose an information processing result based on the recognition result (e.g., Intent: search music, Slot: spring and drive) by the NLU engine 140, propose a service, or determine the recognition result as an unsupported domain or an ambiguous command.

Next, a service processing module 160 recommends search, performs data search, suggests a service, or performs exception processing, based on the processing result of the domain processing module 150.

The service processing module 160 may acquire contents from a content provider (CP) 170 and provide the contents to a user.

The service processing module 160 may perform web search 180 as exception processing. In the instant case, the final selection 190 of the user according to the exception processing may be transmitted to the exception processing management module 114 to generate an exception processing model.

A service conversation generation module 200 may generate a basic scenario for each function for an initial usage method, convert the generated basic scenario for each function to a voice (Text-To-Speech: TTS), and generate the generated basic scenario for each function as a sentence.

For example, the basic scenario may include "Let's go to the nearest Starbucks", "Let me know major news of the day", "Let me know Seoul weather today", and the like.

The service conversation generation module 200, which is a scenario for a help mode, may provide "Let's go to the nearest Starbucks", "Let me know a restaurant near Seoul Station", "Let me know an SK gas station that sells the cheapest gas", and the like.

When the weights are higher in the order of the navigation domain, the music domain, and the weather domain, the service conversation generation module 200 may include, as basic scenarios, "Let me know a river drive course", "Let me know a good song to listen to while driving", "What about the weather around the destination?", and the like.

The service conversation generation module 200 may generate a user model scenario based on the user domain model managed by the user domain management module 113, convert the generated user model scenario into a voice, and generate a sentence corresponding to the generated user model scenario.

For example, when the user domain model includes a sports domain, the user model scenario may include "LAD (Los Angeles Dodgers) baseball score?", "Today LAD baseball schedule?", "Today LAD baseball field weather?", and the like.

The service conversation generation module 200 may provide a voice corresponding to the basic scenario to the user through the speaker, and provide a sentence corresponding to the basic scenario to the user through a display.

The service conversation generation module 200 may provide the voice corresponding to the user model scenario to the user through the speaker, and may provide the user with a sentence corresponding to the user model scenario through the display.

The service conversation generation module 200 may assign weights to the commands and scenarios to increase the frequency of guidance when the functions for the exceptionally processed commands and scenarios based on the data collected by the exception processing management module 114 are added.

The service conversation generation module 200 may generate a service conversation when a malfunction occurs in the vehicle based on the failure information related to the vehicle collected by the vehicle situation analysis module 112.

For example, the service conversation may include "Tire pressure is low. Would you like to get to the nearest garage?", "It is time to replace the engine oil in your vehicle. Would you like to get to a service center?", and the like.

The service conversation generation module 200 may generate the service conversation based on a schedule of the user managed by the schedule management module 115.

For example, the service conversation may include "Today is your wife's birthday. Would you like to get to the nearest bakery?", "It will be difficult to get to the meeting place, Samseong-dong, until 3 o'clock. Would you like to send Mr. Chul-Soo KIM a message that it will be 30 minutes late? Would you like to send?", and the like.

Figure 4:
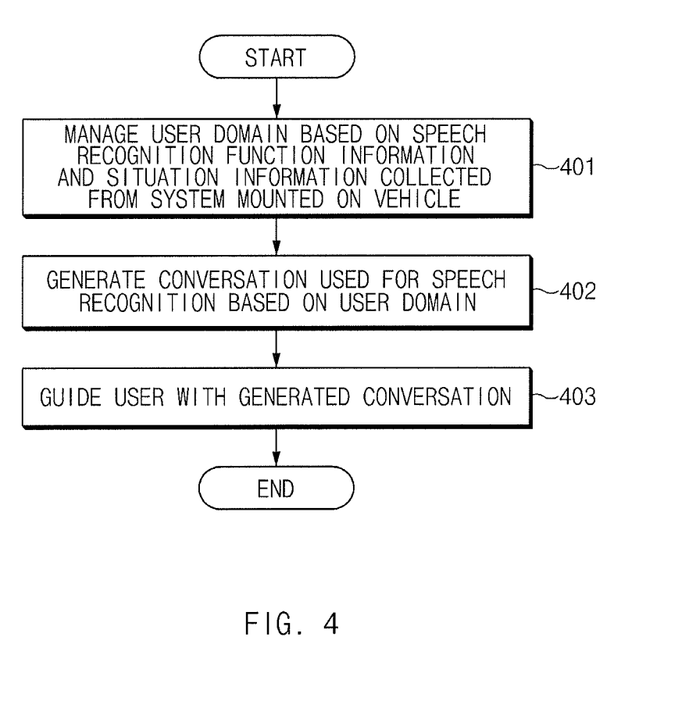
FIG. 4 is a flowchart illustrating a conversation guidance method of a speech recognition system according to various exemplary embodiments of the present invention.

FIG. 4 is a flowchart illustrating a conversation guidance method of a speech recognition system according to various exemplary embodiments of the present invention, which may be performed by a processor included in the speech recognition system or a separate processor.

First, in operation 401, the user domain is managed based on the speech recognition function information and the situation information collected from the system mounted on the vehicle. That is, in all the domains, a domain (user domain) selected based on the speech recognition function and the situation of the vehicle is managed in real time.

Thereafter, in operation 402, a conversation used for speech recognition is generated based on the user domain. That is, a domain is selected among the user domains arbitrarily or based on a weight, and a conversation corresponding to the selected domain is generated. In the instant case, the conversation may be a voice command. For example, when the weather domain is selected, the voice command may be "Let me know Seoul weather today", and the like.

Thereafter, in operation 403, the generated conversation is provided to the user. In the instant case, the time point when the generated conversation is provided may be a time point when the user presses a push-to-talk (PTT) button to input a voice command, a time point when a help mode is entered by the user, or the like.

Thereafter, when a function corresponding to the exceptionally processed voice command is added, a weight is added to the voice command to increase the frequency of guidance.

Figure 5:
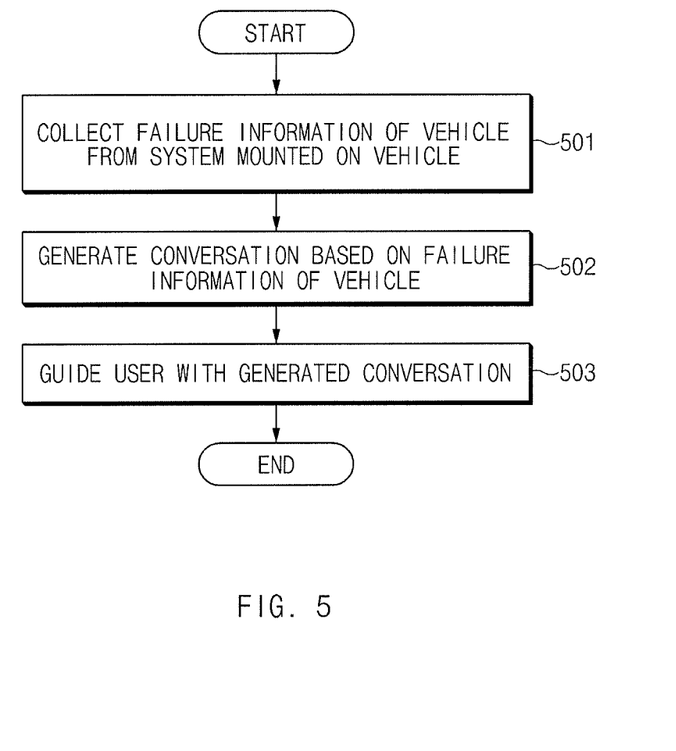
FIG. 5 is a flowchart illustrating a conversation guidance method of a speech recognition system according to various exemplary embodiments of the present invention.

FIG. 5 is a flowchart of a conversation guidance method of the speech recognition system according to various exemplary embodiments of the present invention, which may be performed by a processor included in the speech recognition system or a separate processor.

First, in operation 501, the failure information related to the vehicle is collected from the system mounted on the vehicle. In the instant case, the failure information may be classified into an urgent failure and a non-urgent failure, where the non-urgent failure may include a tire pressure, a lamp disconnection, and the like, and the urgent failure may include an engine warning lamp lighting, an engine shutdown, and the like.

As such, in operation 502, a conversation is generated based on the failure information related to the vehicle. For example, in the case of the engine shutdown, the conversation may include "Would you like to call a designated maintenance center?", "Would you like to call a towing vehicle?", or the like.

As such, in operation 503, the generated conversation is guided to the user. In the instant case, the conversation is a scenario in a form of proposal rather than a voice command to direct.

Figure 6:
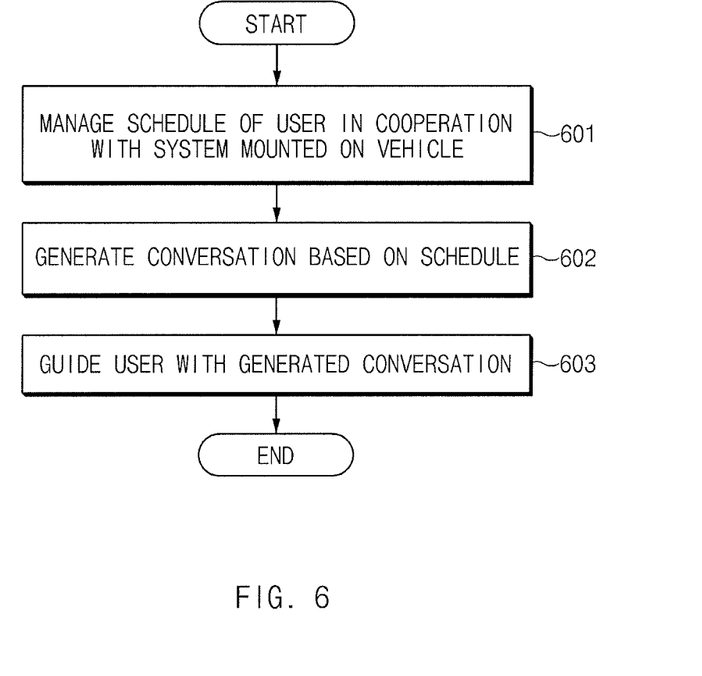
FIG. 6 is a flowchart illustrating a conversation guidance method of a speech recognition system according to various exemplary embodiments of the present invention.

FIG. 6 is a flowchart illustrating a conversation guidance method of a speech recognition system according to various exemplary embodiments of the present invention, which may be performed by a processor included in the speech recognition system or a separate processor.

First, in operation 601, the schedule of a user is managed in cooperation with a system mounted on a vehicle (601).

As such, in operation 602, a conversation corresponding to the schedule is generated. That is, a conversation (scenario) in a form of proposal is generated when the schedule arrives or immediately before the schedule arrives.

For example, when a schedule arrives (anniversary, or the like), the conversation may be "Today is your wife's birthday. Would you like to get to the nearest bakery?". The conversation immediately before the arrival of the schedule (appointment time, or the like) may be "It may be difficult to arrive at the meeting place, Samseong-dong, at 3 o'clock. Would you like to send Mr. Chul-Soo KIM a message that it may be 30 minutes late". In the instant case, Mr. Chul-soo's phone number may be identified in the user's phonebook.

As such, in operation 603, the generated conversation is guided to the user. In the instant case, the conversation is a scenario in a form of proposal rather than a voice command to direct.

Figure 7:
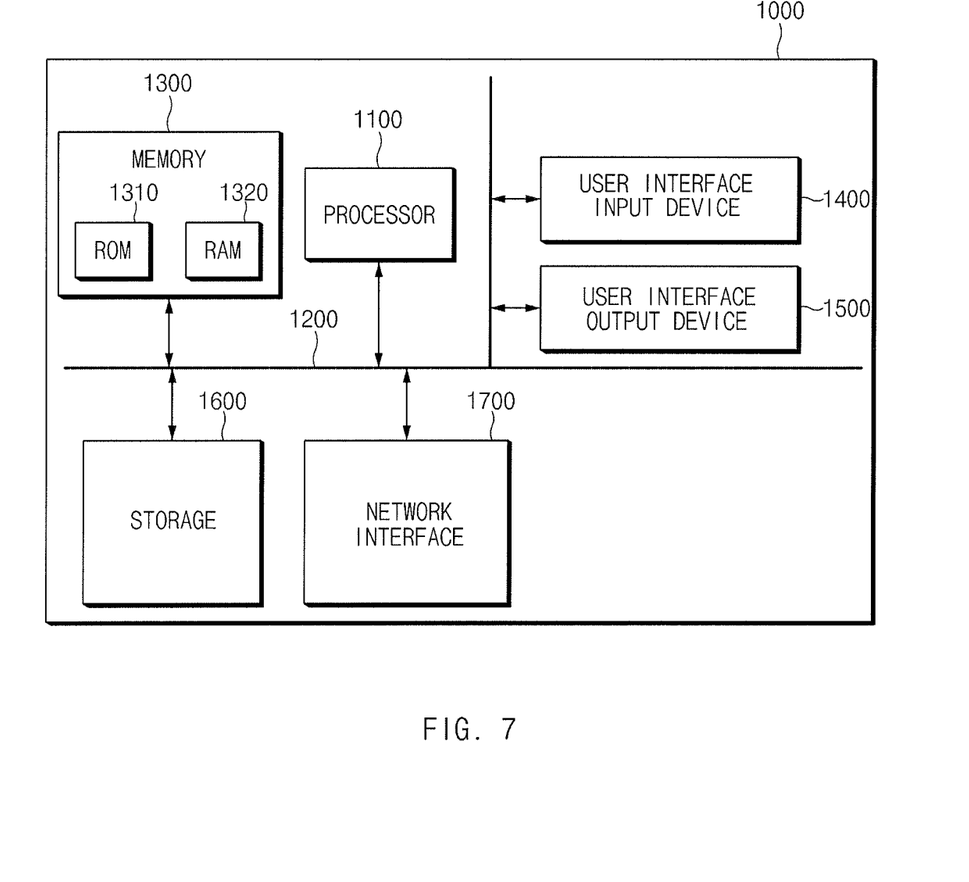
FIG. 7 is a block diagram illustrating a determining system for executing a conversation guidance method of a speech recognition system according to an exemplary embodiment of the present invention.

FIG. 7 is a block diagram illustrating a determining system for executing a conversation guidance method of a speech recognition system according to an exemplary embodiment of the present invention.

Referring to FIG. 7, the conversation guidance method of the speech recognition system according to an exemplary embodiment of the disclosure may be implemented through a determining system. A determining system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a solid state drive (SSD), a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the conversation guidance method of a speech recognition system of an exemplary embodiment of the present invention, it is possible to allow a user to easily recognize a voice command used for speech recognition by allowing the speech recognition system to guide the user to a customized conversation and to improve user satisfaction through a proposal corresponding to a situation of the user, wherein the speech recognition system generates a domain (hereinafter, referred to as a user domain) optimized for the user based on a function and a situation of a vehicle and manages the user domain by reflecting a user's selection of an exceptionally processed result which is not normally recognized.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of guiding a conversation for a speech recognition system, the method comprising:
    managing a user domain based on speech recognition function information and situation information collected from a system mounted on a vehicle;
    generating a conversation used for speech recognition based on the user domain; and
    guiding a user with the generated conversation,
    wherein the managing of the user domain includes:
        further managing the user domain by reflecting a user selection of an exceptionally processed result, and
    wherein the further managing of the user domain includes:
        generating an exception processing model '1' based on a user selection of an exceptionally processed result of an ambiguous command; and
        generating an exception processing model '2' based on a user selection of an exceptionally processed result of an unsupported command.

2. The method of claim 1, wherein the conversation includes a voice command.

3. The method of claim 2, wherein the generating of the conversation includes:
    when a function corresponding to a voice command exceptionally processed is added, weighting the voice command to increase frequency of guidance.

4. The method of claim 1, wherein the guiding of the user includes:
    guiding the generated conversation by a voice.

5. The method of claim 1, wherein the guiding of the user includes:
    guiding the generated conversation by a sentence.

6. The method of claim 1,
wherein the user domain includes a plurality of main domains, and
wherein each of the plurality of main domains includes a plurality of subdomains.

7. The method of claim 6, wherein the managing of the user domain includes:
activating or inactivating a specific main domain; and
activating or inactivating a specific subdomain.

8. The method of claim 6, wherein the managing of the user domain further includes:
determining when to activate the main domains and the subdomains based on user preference information collected from the system mounted on the vehicle.

9. The method of claim 8, wherein the determining of when to activate the main domain and the subdomain include:
determining when to activate the main domains and the subdomains based on a menu priority or a favorite set by the user as the user preference information.

10. The method of claim 1, wherein the further managing of the user domain includes:
assigning a weight to a domain selected by the user.

* * * * *